United States Patent [19]

Pean et al.

[11] Patent Number: 4,715,985

[45] Date of Patent: Dec. 29, 1987

[54] COMPOSITION FOR CHECKING THE FUNCTIONING OF FIRE DETECTION INSTALLATIONS AND APPLICATION TO VARIOUS TYPES OF DETECTORS

[75] Inventors: Jean-Louis Pean, Montlhery; Catherine Desvard, Maurepas, both of France; Jean-Paul Barbier, Chicago, Ill.

[73] Assignee: L'Air Liquide, Societe Anonyme pour l'Etude et l'Exploitation des Procédés George Claude, Paris, France

[21] Appl. No.: 793,085

[22] Filed: Oct. 30, 1985

[30] Foreign Application Priority Data

Oct. 30, 1984 [FR] France ................................ 84 16562

[51] Int. Cl.[4] ................................................ C09K 3/30

[52] U.S. Cl. .................................... 252/305; 73/1 G; 252/408.1

[58] Field of Search .............. 252/305, 408.1; 73/1 G, 73/1 R; 222/4

[56] References Cited

U.S. PATENT DOCUMENTS

| | | | |
|---|---|---|---|
| 2,285,950 | 6/1942 | Sullivan et al. | 252/305 X |
| 2,995,521 | 8/1961 | Bluard | 252/305 X |
| 3,693,401 | 9/1972 | Purt . | |
| 3,822,145 | 7/1974 | Edison et al. | 252/305 X |
| 4,243,548 | 1/1981 | Heeb et al. | 252/305 |
| 4,301,674 | 11/1981 | Haines . | |

FOREIGN PATENT DOCUMENTS

| | | | |
|---|---|---|---|
| 2734265 | 2/1979 | Fed. Rep. of Germany | 252/305 |

*Primary Examiner*—John F. Terapane
*Assistant Examiner*—John S. Maples
*Attorney, Agent, or Firm*—Browdy and Neimark

[57] ABSTRACT

Compositions for checking the functioning of fire detectors comprising at least 75% of at least one haloalkane, up to 15% of at least one volatile organic compound selected from the group consisting of alcohols, oxoderivatives, and ethers, a small amount of an organic compound having a vapor pressure less than 0.1 millibar, and an optional propellant. The composition can be used to check the functioning of ionization detectors, combustible gas detectors, and optical smoke detectors.

10 Claims, No Drawings

COMPOSITION FOR CHECKING THE FUNCTIONING OF FIRE DETECTION INSTALLATIONS AND APPLICATION TO VARIOUS TYPES OF DETECTORS

FIELD OF THE INVENTION

This invention relates to compositions for checking the functioning of fire detectors.

BACKGROUND OF THE INVENTION

Smoke, heat and combustible gas detectors are of several types that are generally very different in operation.

Ionization smoke detectors, whose functioning is related to the changes of the electric conductivity of the air in the presence of fire aerosols, react under the effect of combustion products in the form of visible or invisible fire aerosols.

According to the operating principle of these detectors, an electric field is set up between two electrodes by a DC voltage. When the air between the electrodes is ionized, for example by a radioactive source, the resulting ions move under the effect of the field in the direction of the oppositely charged electrode. An electric current results whose current strength depends on the number and velocity of the ions. When fire aerosols penetrate into the space between the two electrodes, a part of the ions is deposited onto the particles of these aerosols, up to about a thousand times heavier than the ions. The heavy ions thus obtained hardly move any longer because of the mass inertia and thereby no longer contribute to carrying of charges, and the current diminishes.

Combustible gas detectors consist of a semiconductive gas sensor selectively sensitive to certain combustible gases such as methane, propane and hydrogen.

In optical smoke detectors, the very sensitive optoelectronic system, being made up of a specially developed semiconductive diode as an infrared light source, a silicon cell as light receiver, a light absorber and a protection from light from other sources, functions according to the light diffusion principle. The optics of the diode emits light impulses in the shape of a hollow cone. As long as the measuring chamber does not contain any smoke, the infrared light does reach the receiver placed in the center of the axis of the light cone. In penetrating the labyrinth chamber, the smoke particles disperse the light rays in all directions. A part of the dispersed light reaches the photoelectric receiver which then produces an electric signal.

There is now no satisfactory product for checking the functioning of these three types of detectors.

Mixtures of dichlorodifluoromethane and diclorotetrafluoroethane in proportions of 80 and 20% by weight, respectively, offered in aerosol cans are now packaged to check the functioning of ionization smoke detectors. These mixtures are not suitable for other types of detectors.

There is now no satisfactory product for checking the functioning of all three types of detectors. The nature of the products to check the correct functioning of each type of detector is different, depending on the type of detector used.

For ionization smoke detectors, products are used that stop the ions created in the air by the radioactive source, particularly by the formation of sufficiently heavy particles, and of sensing radioactive source radiations. These products can be organic chlorofluoro, fluoro products and gases such as nitric oxide and carbon dioxide.

The combustible gas detectors respond selectively, depending on the nature of the hydrocarbon; on the other hand, they are all more sensitive to other products such as alcohols, ethers, aldehydes, ketones, and, generally, to numerous volatile organic compounds.

Two means can be used for optical smoke detectors to create particles diffracting the light. According to one method, an aerosol of fine liquid droplets, of products with a slight vapor tension less than 0.1 millibar, and preferably less than 0.01 millibar, dissolved in a large amount of a solvent with a high vapor tension, can be used. According to another technique, a liquid which, on vaporizing, sufficiently cools the atmosphere of the chamber to transform the steam of the air into ice crystals, can be used.

SUMMARY OF THE INVENTION

Effective compositions have been found to check the functioning of various types of smoke and combustible gas detectors. These compositions, in the form of homogeneous mixtures of products that are active in regard to the three main types of detectors now used, offer the advantage of being more all-purpose than existing mixtures which are active only toward a single type of detector.

The active products are introduced into the checking composition in such proportions that, regardless of the type of detector, there is a slight consumption of the composition of the mixture at each test, of 0.5 to 2 grams, corresponding to injection times of 1 to 2 seconds; a very slight response time of the detectors, maximum 10 seconds; and a very short persistence, less than 10 seconds. The persistence time is the period during which the detector remains on alarm after injection.

The mixture of active products further meets the following requirements: there is no danger of toxicity or corrosion, no formation of solid residues, with very slight vapor tension which would clog the detectors. Further, packaging in aerosol cans is easy and this mixture meets aerosol standards, and is not subject to a particular labeling requirement relating to toxic and flammable mixtures.

The mixtures developed in aerosol form to check the functioning of all types of smoke, optical or ionization and combustible gas detectors comprise at least one haloalkane in an amount greater 75% by weight, at least one volatile organic compound with simple oxygen function of the alcohol, oxo derivation, ether oxide type in an amount less than 15% by weight, and a small amount of organic product with a low vapor pressure, less than 0,1 millibar at most a few precent by weight.

In case all the preceding constituents are liquids, there is introduced into the mixture a propellant gas that is very soluble in these liquids, such as nitric oxide or carbon dioxide.

The haloalkanes can be selected from chlorofluoro, chloro or fluoro alkanes, such as trichlorotrifluoroethane. Each mixture can contain one or more haloalkanes.

Of the volatile organic compounds, the preferred compounds are compounds with simple oxygen function such as alcohols, particularly acyclic alcohols, oxo derivatives, and ether oxides. Of the ethers, ethyl ether has proven to be particularly advantageous. Also, alkyl phthalates are satisfactory. As organic products with 2. The composition of claim 1 containing from about 80 to about 95% by weight of trichlorotrifluoroethane, from about 1 to about 10% by weight of ethyl ether, from about 0.05 to about 1% by weight of a compound selected from the group consisting of ethyl phthalate and butyl phthalate, and nitrous oxide in a quantity sufficient to make 100% by weight.

3. An aerosol composition according to claim 1 including a suitable propellant gas.

4. A method of checking the functioning of fire detection installations selected from the group consisting of ionization detectors, combustible gas detectors, and optical smoke detectors, comprising introducing into the vicinity of the detector a small amount of the composition of claim 1.

5. The composition of claim 1 wherein the constituents are all liquid, including a propellant gas soluble in the liquid.

6. The composition of claim 5 wherein the propellant gas is selected from the group consisting of nitrous oxide and carbon dioxide.

7. The composition of claim 1 containing from about 90 to 95% by weight of trichlorotrifluoroethane, about 1% by weight of ethyl ether, from about 0.05 to about 0.10% of a compound selected from the group consisting of ethylphthalate and butyl phthalate, and nitrous oxide in a quantity sufficient to make 100% by weight.

8. The composition of claim 7 containing from about 92 to about 92.5% by weight trichlorotrifluoroethane, about 1% by weight of ethyl ether, from about 0.05 to about 0.10% by weight of a compound selected from the group consisting of ethyl phthalate and butyl phthalate, and nitrous oxide in a quantity sufficient to make 100% by weight.

9. The composition of claim 8 containing about 92.20% by weight of trichlorotrifluoroethane about 1% by weight of ethyl ether, about 0.10% by weight of ethyl phthalate, and nitrous oxide in a quantity sufficient to make 100%.

10. The composition of claim 8 containing about 92.25% by weight of trichlorotrifluoroethane, about 1% by weight of ethyl ether, about 0.05% by weight of butyl phthalate, and nitrous oxide in a quantity sufficient to make 100%.

* * * * *